Oct. 25, 1927.
S. M. CODE
1,646,611
AMPHIBIOUS VEHICLE
Filed Sept. 20, 1926
2 Sheets-Sheet 2
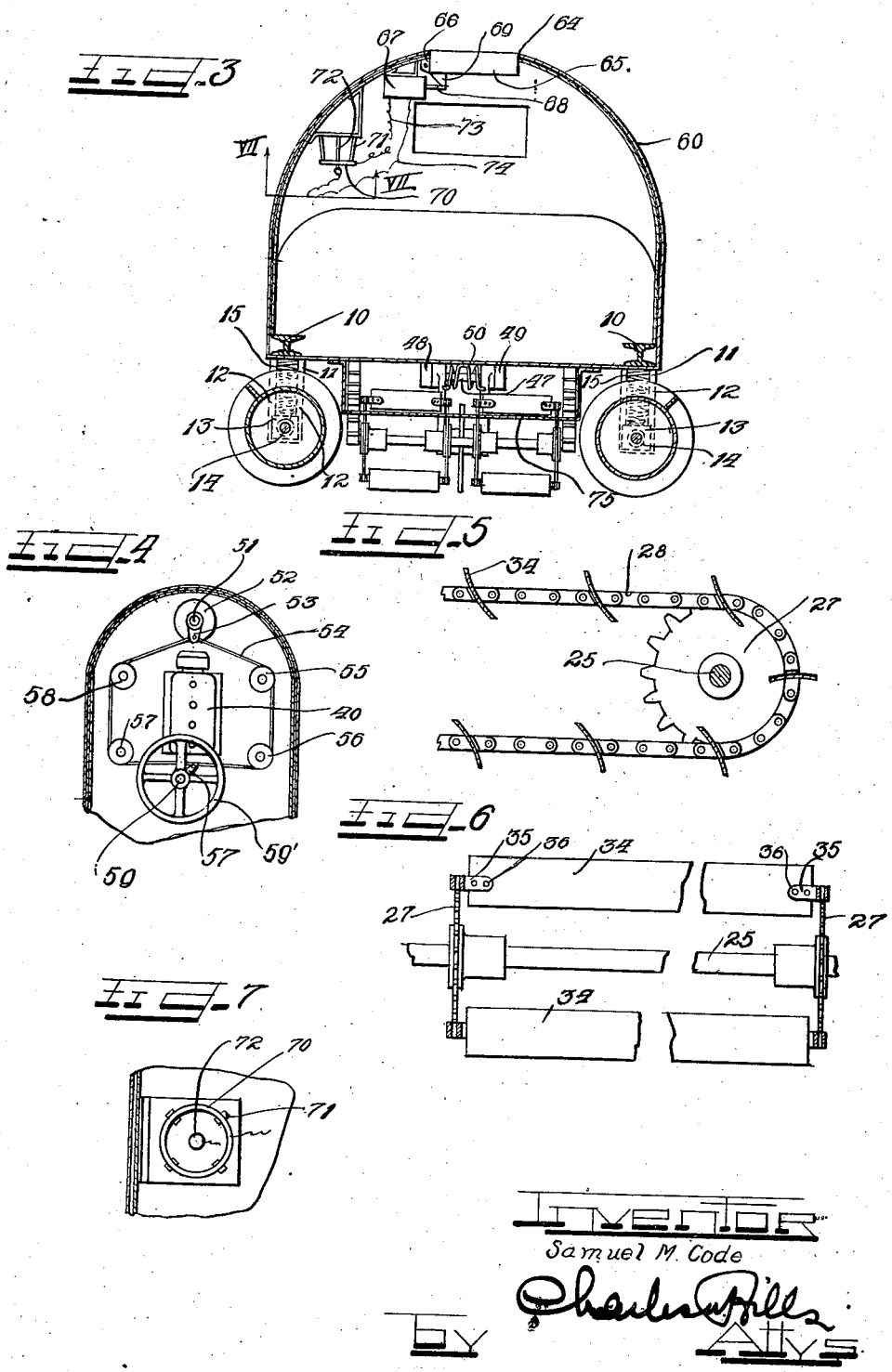

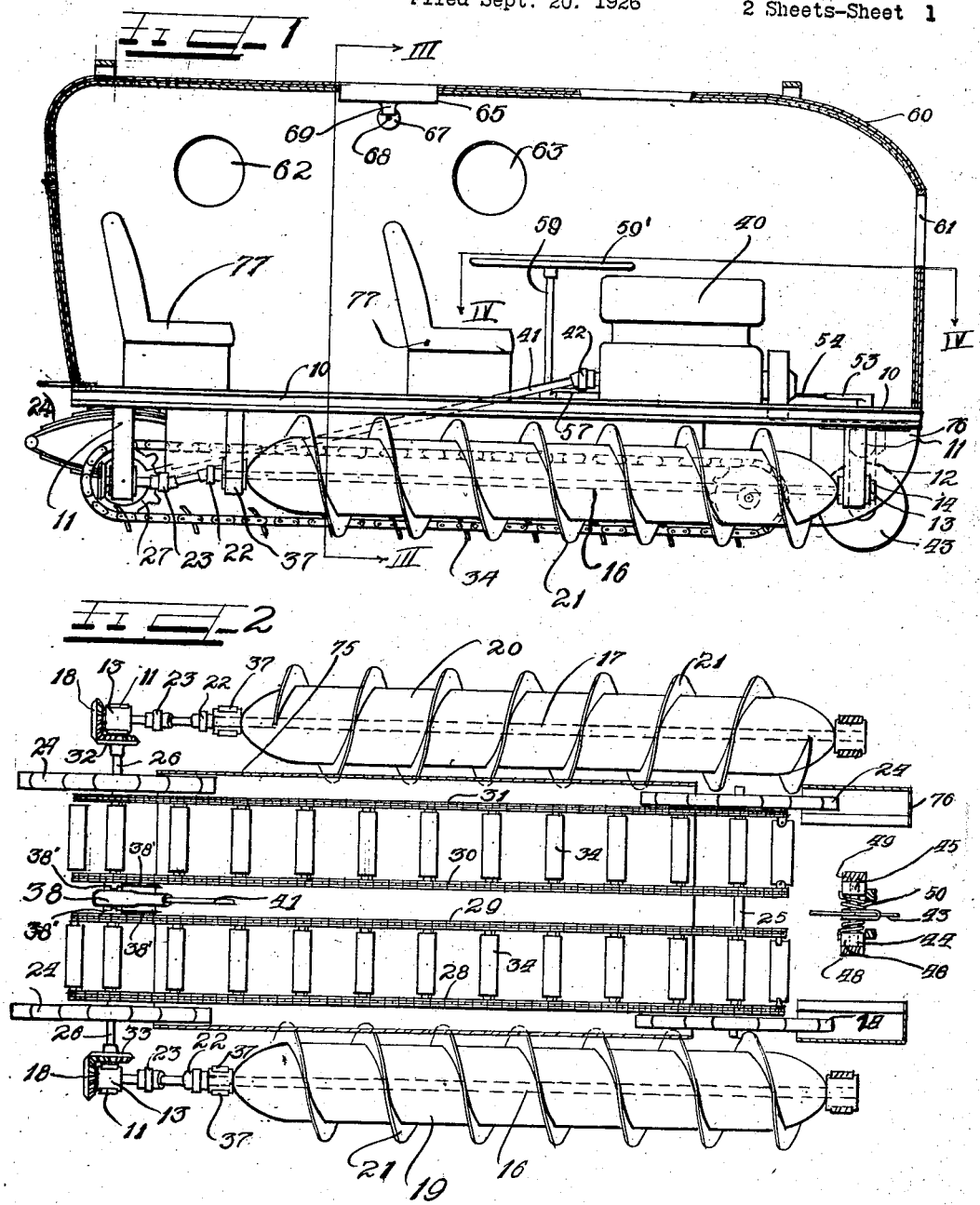

Patented Oct. 25, 1927.

1,646,611

UNITED STATES PATENT OFFICE.

SAMUEL M. CODE, OF CHICAGO, ILLINOIS.

AMPHIBIOUS VEHICLE.

Application filed September 20, 1926. Serial No. 136,428.

This invention relates to amphibious vehicles and more particularly to that type of vehicle which is adapted for travel with equal facility on land, water, or ice.

It contemplates more especially the provision of an amphibious vehicle of the type disclosed in my pending application, Serial No. 77,367, this application being a continuation in part of the above identified application.

One object of the present invention is to simplify and improve the construction of devices of the character mentioned.

Another object is to provide amphibious traction means.

Still another object is to provide an automatically operable closure for the body of the vehicle.

A further object is to provide a plurality of vehicle traction means which are simultaneously operative on land, ice, and water.

Other objects and advantages will appear from the following disclosure of an illustrated embodiment of the present invention.

In the drawings:

Figure 1 is a sectional view in elevation of a vehicle embodying features of the present invention.

Figure 2 is a plan view of amphibious traction means used in connection with the vehicle shown in Figure 1.

Figure 3 is a sectional view taken substantially along line III—III of Figure 1.

Figure 4 is a fragmentary sectional view taken substantially along line IV—IV of Figure 1.

Figure 5 is a fragmentary detail view of a portion of the traction means shown in Figure 2.

Figure 6 is an enlarged detail view of the propelling means shown in Figure 5.

Figure 7 is a view taken substantially along line VII—VII of Figure 3.

The vehicle selected for illustration comprises a suitable frame or chassis 10 having vertically disposed standards or supports 11 consisting of U-shaped members 12 secured to the under side of the frame 10 near the corners thereof. Slidably fixed in each of the members 12 is a journal box 13 which is provided with a suitable bearing 14 defining a horizontally disposed bore. Yieldable means, in this instance a resilient spring 15, is interposed between the frame 10 and the journal box 13 within the member 12 to normally urge the journal boxes 13 to their extreme lower position.

Journaled in the aligned standards are the shafts 16 and 17 which extend longitudinally of the normal direction of travel, each having a beveled gear 18 secured to the extremity of the shaft projecting from the rear standards 11. Traction means, in this instance, resilient mounted elongated pontoons 19 and 20 are secured to the shafts 16 and 17, respectively, they being hermetically sealed thereto to give the vehicle the desired buoyancy to effect the flotation thereof in travelling through water. The pontoons 19 and 20, in this instance, have provided thereon convolutions constituting spiral blades 21 defining a helix along the length of the pontoons so as to serve as amphibious propelling means when being rotated by the shafts 16 and 17 which are operatively connected to the power means to be hereinafter described. It is to be noted that the shafts 16 and 17 may as in the present showing be provided with flexible joints 22 and 23 in order that the rear bearings 13 may extend beneath the front bearings for reasons that will hereinafter be apparent.

Elliptical cantilever springs 24, in this instance, four, of standard construction are secured to the chassis in the usual manner to yieldably support front and rear parallel spaced shafts 25 and 26 which are provided with aligned sprocket wheels 27 fixed on the shaft to positively drive endless chains 28, 29, 30, and 31 disposed intermediate the pontoons 19 and 20 in parallel, spaced relation therewith. It is to be noted that the rear shaft 26 has a pair of bevelled gears 32 and 33 fixed thereto at the extremities thereof to mesh with the gears 18 disposed at the rear ends of the shafts 16 and 17, so that a driving connection is established between the shaft 26, the pontoons 16 and 17, and the endless chains hereinabove referred to. The chains 28 and 29 as well as the chains 30 and 31 are connected by means of parallel blades or paddles 34 which are spaced equi-distantly along the length thereof by means of the projecting lugs 35 secured to the chains in any appropriate manner and riveted or otherwise fixed to the blades 34 by means of the fasteners 36 (Figure 6).

The paddles 34, in this instance, have a curved surface and constitute traction means for effecting locomotion of the vehicle on land, ice, or water, they serving as amphibious propelling means in conjunction with the blades 21 of the pontoons 16 and 17. Obviously, if desirable, the rear extremity of the pontoons 19 and 20 may be additionally supported by means of a standard 37 which is secured to the frame at one extremity thereof, the other extremity having a suitable bearing to rotatably sustain the pontoons therein.

A differential 38 of standard construction is provided in the shaft 26 intermediate the ends thereof to differentially associate the symmetrical pairs of amphibious traction or propelling means constituting on one hand the pontoon 19 and the chains 28 and 29, and on the other hand the pontoon 20 and the chains 30 and 31, it being understood that the differential is desirable in maneuvering the vehicle in various directions as will subsequently be described.

The power means for driving the propelling means, in this instance, consists of an internal combustion engine 40 of standard construction, which is mounted on the frame 10 near the forward end thereof. A driving shaft 41 is operatively connected to the crank shaft of the combustion engine 40 by means of a flexible or universal joint 42, the other extremity of the shaft 41 being connected to the differential 38 by means of gearing commonly provided in the differential casing for that purpose.

The steering mechanism, in this instance, consists of a suitable disc 43 rotatably mounted on a shaft 44 disposed between the vertical spaced standards 45 and 46 which are pivotally associated with the floor of the frame 10 by means of the rod 47 journaled in the spaced members 48 and 49 rotatably mounted in any appropriate manner to the floor of the frame 10. A helical spring 50 is disposed intermediate the standards 45 and 46 around the shaft 44 to normally urge the disc in a vertical operative position, so that the latter will have a frictional driving relation with the surface being traversed by the vehicle, it being understood that by turning the disc 43 in the desired direction the vehicle may be selectively turned to approach any direction. The differential compensates for the difference in speeds of the propelling means on either side thereof during the turning movement. Obviously, this disc 43 will serve as a rudder for steering purposes in water, it being positioned in the bow of the vehicle. It is to be noted that the standards 45 and 46 are pivotally mounted as described above to move in a clockwise direction against the action of the spring 50, so that the disc 43 will be moved backwardly when it strikes an abutment as when the vehicle passes from water to land, thereby avoiding the obstructions without any destructive resistance. The abutments 48 and 49 are rotatively associated with the floor of the frame 10 by means of a vertically extended rod 51 which is journaled in the frame and has a disc 52 secured thereon above the floor of the frame to prevent vertical movement of the rod 51. A crank arm 53 is secured to the extremity of the crank rod 54, the end of which is operatively connected to a cord 54 which is in frictional contact with appropriately spaced pivotal rollers 55, 56, 57, and 58. The cord 54 is operatively connected to another crank arm 57 which is secured to a steering rod 59 having a steering wheel 59' of standard construction, fixed to the extremity thereof.

A pair of clutch control rods 38' are operatively connected to the steering rod 59, so as to automatically disengage its respective clutch 38" which selectively establishes a driving connection between the traction means disposed on either side of the differential 38. With this arrangement it will be apparent that the traction means on either side of the differential may be automatically rendered inoperative to facilitate the steering of the vehicle in a customary manner.

A double-wall body 60 of any suitable configuration, is securely mounted on the frame 10, it having a windshield 61 secured in the front end thereof, with portholes 62 and 63 provided in the side walls so that the exterior thereof may be conveniently viewed from within. An opening 64 is provided, in this instance, in the top of the body for ventilation purposes. A closure 65 is hingedly mounted as at 66 to close the opening 64 whenever desirable such as when the vehicle passes from land to water, it being desirable to exclude all water from within the body. As shown, the closure 65, is automatically operable responsive to the tilting of the body occurring when the vehicle passes from land to water so that there will be no possible chance of the interior of the body becoming flooded. Means for automatically closing the closure 65, in the present embodiment, consists of electrical magnetic means including an electromagnet 67 having an iron core 68 in the form of a rod connected to an ear 69 fixed to the closure 65. A circular metallic member 70 is suspended in any appropriate manner from the body 60, as by means of the rods 71, there being confined within the ring 70, a freely swingable metallic pendulum 72 adapted to contact with the ring 70 when the body 60 is tilted. An electrical connection is established between the ring 70 and one terminal of the electro-magnet by means of the wire 73, the other terminal of the electro-magnet being connected to a current source by means of a wire 74 so that the pendulum 72 and the ring 70 constitute the ends of an electrical circuit. With this arrangement, the pendulum contacts with the ring 70, thereby energizing the electro-magnet 67 which effects movement of the closure 65 to its closed position. Obviously, any appropriate means may be provided to maintain the closure over the opening, it being desirable that a latch be provided which requires a manual release of the closure.

A snow guard 75 of sheet material is suspended from the underside of the frame extending horizontally between chains and paddles so as to prevent the accumulation of snow under the chassis. Runners 76 are secured to the forward part of the chassis to facilitate its mergence from the water to land.

Within the body 60 there is provided any number of seats 77 which are sustained by the frame 10 so as to accommodate individuals confined within the body. It will be apparent from the foregoing that an amphibious vessel has been provided which travels with equal facility on land or water or ice, it being understood that the speed obtainable depends largely on the power means 40, since the traction means hereinabove described are adaptable to effectively operate at high or moderate speeds.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. In a vehicle, a frame, propeller pontoons rotatively mounted on either side of said frame, a shaft disposed intermediate said pontoons, gearing operatively connecting said shaft and pontoons, a differential in said shaft, sprockets mounted on said shaft, a plurality of endless chains intermediate said pontoons, sprocket wheels mounted on either side of said differential on said shaft for driving said chains, and blade propellers carried at spaced points on said chains to cooperate with said pontoons for moving said vehicle.

2. In a vehicle, a frame, propeller pontoons rotatively mounted on either side of said frame, a shaft disposed intermediate said pontoons, gearing operatively connecting said shaft and pontoons, a differential in said shaft, sprockets mounted on said shaft, a plurality of endless chains intermediate said pontoons, sprocket wheels mounted on either side of said differential on said shaft for driving said chains, blade propellers carried at spaced points on said chains to cooperate with said pontoons for moving said vehicle, and amphibious steering means mounted in the bow of said vehicle and clutches to disengage power means from either side of traction members.

3. In a vehicle, a frame, propeller pontoons rotatively mounted on either side of said frame, a shaft disposed intermediate said pontoons, gearing operatively connecting said shaft and pontoons, a differential in said shaft, sprockets mounted on said shaft, a plurality of endless chains intermediate said pontoons, sprocket wheels mounted on either side of said differential on said shaft for driving said chains, blade propellers carried at spaced points on said chains to cooperate with said pontoons for moving said vehicle, amphibious steering means mounted in the bow of said vehicle, said steering means comprising a centrally disposed disc, a support for said disc, said support being pivotally associated with said frame, and resilient means for normally maintaining said support in an operative position and clutches to disengage power means from either side of traction members.

4. In a vehicle, a frame, propeller pontoons yieldably supported from said frame, and other propelling means carried by said frame, said propeller pontoons and other propelling means constituting amphibious traction means.

5. In a vehicle, a frame, rotary propeller pontoons yieldably associated with said frame, on either side thereof, other propelling means disposed between said pontoons, said propelling means being in pairs, and a differential disposed centrally of said pontoons and propelling means.

6. In a vehicle, a frame, propelling pontoons, supports for said pontoons, resilient means in said supports for yieldably suspending said pontoons, and driving means for said pontoons including a shaft extending axially through each of said pontoons, said shafts being journalled in said supports and hermetically sealed to said pontoons.

In testimony whereof I have hereunto subscribed my name.

SAMUEL M. CODE.